United States Patent [19]
Koellensperger

[11] 4,430,750
[45] Feb. 7, 1984

[54] METHOD AND APPARATUS FOR AUTOMATIC RECOGNITION OF AN IMAGE PATTERN, PARTICULARLY OF A LINE PATTERN

[75] Inventor: Paul Koellensperger, Munich, Fed. Rep. of Germany

[73] Assignee: Siemens Aktiengesellschaft, Berlin & Munich, Fed. Rep. of Germany

[21] Appl. No.: 256,792

[22] Filed: Apr. 23, 1981

[30] Foreign Application Priority Data

May 12, 1980 [DE] Fed. Rep. of Germany ....... 3018170

[51] Int. Cl.³ .............................................. G06K 9/32
[52] U.S. Cl. ......................................... 382/8; 382/41; 382/48
[58] Field of Search ................. 340/146.3 Y, 146.3 H, 340/146.3 AH; 364/515, 488–491; 382/8, 41, 48

[56] References Cited

U.S. PATENT DOCUMENTS

| | | | |
|---|---|---|---|
| 3,618,016 | 11/1971 | Van Steenis | 340/146.3 Y |
| 3,760,356 | 9/1973 | Srivastava | 340/146.3 Y |
| 3,898,617 | 8/1975 | Kashioka et al. | 340/146.3 H |
| 4,091,394 | 5/1978 | Kashioka et al. | 340/146.3 H |
| 4,213,117 | 7/1980 | Kembo et al. | 340/146.3 H |

FOREIGN PATENT DOCUMENTS

2404183 12/1978 Fed. Rep. of Germany.

*Primary Examiner*—Leo H. Boudreau
*Attorney, Agent, or Firm*—Hill, Van Santen, Steadman & Simpson

[57] ABSTRACT

Proceeding from known methods for evaluating the similarity of image patterns by scanning an image field carrying the pattern and by comparing the same with a reference pattern, the degree of similarity of the mean values of the column of the scanning signals is identified with the assistance of feature addresses related to the pattern sought by a spatial shift of the scanning signals of the image field around a respective plurality of prescribable column points.

9 Claims, 2 Drawing Figures

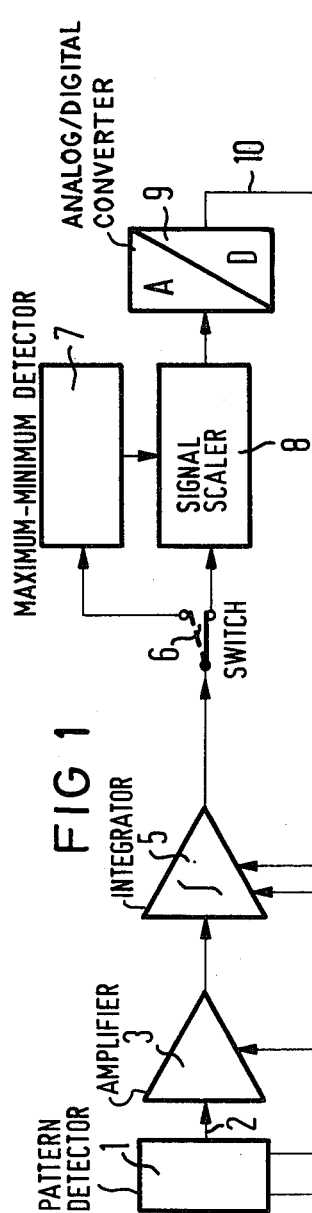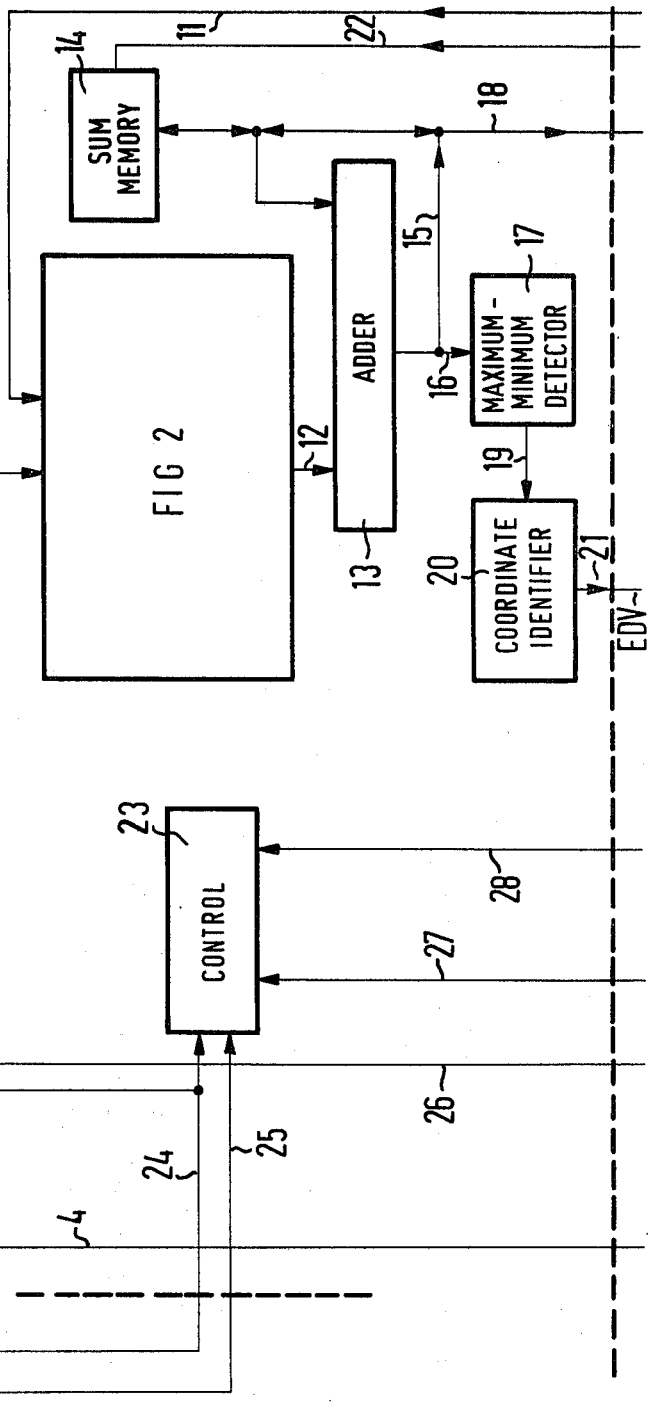

METHOD AND APPARATUS FOR AUTOMATIC RECOGNITION OF AN IMAGE PATTERN, PARTICULARLY OF A LINE PATTERN

BACKGROUND OF THE INVENTION

1. Field of the Invention

The present invention relates to a method and to apparatus for the recognition of image patterns, particularly of a line pattern, with the assistance of scanning devices for an image field carrying the pattern in which a discovery of the object image with the desired pattern is executed by converting image points into electrical signal sequences and by comparing the signal sequences to signals of a stored pattern.

2. Description of the Prior Art

In the German Patent No. 2,404,183, techniques are disclosed for recognizing the position of a pattern, particularly for the recognition of the surface geometry of a semiconductor component, in order to be able to automatically bond the component. For this purpose, the position recognition system is constructed in such a manner that one or more topical patterns of a subject are stored as standard patterns; in that the topical patterns and the two-dimensional patterns of the subject as are input from an image sensor are constantly compared; and in that the coordinate position with the best coincidence is identified. In this comparison method, the discrete amplitude supporting values of the correlation function are re-calculated independently of one another from shift coordinate-to-shift coordinate.

SUMMARY OF THE INVENTION

The object of the present invention is to provide, with the simplest possible structure, a method and an apparatus for locating a pattern with the assistance of prescribed features from a plurality of line patterns corresponding to image patterns within the visual range of a recognition circuit and to determine the position of the pattern with respect to a defined zero point perpendicular to the line pattern.

The above object is achieved, according to the present invention, in that, with repeated, spatial shift, with respect to stored feature addresses, of column signals formed from the scanning signals of the image shield, properties of the column signals are evaluated in a memory around a respective, preselectable plurality of column points with the assistance of stored feature addresses and the degree of similarity to a desired pattern is identified in real time, in that, depending upon the column signal sought, the positive or negative sums of the numerical values corresponding to the weighted column signals are formed within selected memory areas defined by the stored feature addresses, the memory areas corresponding to the sections of the scanning signal.

A respective feature address provided with a positive operational sign and a negative operational sign forms one memory area which, for example, is assigned to a flagpole of the actual pattern. Memory areas formed in such a manner can also be nested. If, for example, a positive column value of the actual pattern is inscribed into the memory area, then it is positively evaluated with the positive feature address and is summed. An amplitude value is read or, respectively overwritten from the memory area for each value inscribed. The value is negatively evaluated with the negative feature address and is subtracted from the sum. The difference of the sum of the previously-inscribed amplitude values thereby arising to the sum of the previously read amplitude values is identical to the momentary content of the memory area. The sum of the contents of the memory areas formed by the feature addresses corresponds to an amplitude-supporting value of the comparison function when the overall actual value memory is canceled at the beginning of the correlation. By clock-controlled writing and reading of the column signals of the actual pattern, all amplitude-supporting values are calculated, in succession, and the comparison function is formed.

The significant advantage of the invention is substantiated in the fact that, according to the method thereof, it is only the change of an amplitude-supporting value with respect to the next, successive amplitude supporting value which is calculated. The method of the present invention is advantageously suited for the one-dimensional position recognition of mutilated and noise-infested line patterns.

Given the adjustment mark geometry employed in the present invention, the necessary, comparable plurality of computation operations per grid point is significantly reduced. Moreover, instead of inflexible shift registers, more highly-integrated semiconductor memories having random access can very advantageously be employed. By so doing, there exists the possibility of matching the length of the comparator region to the width of the adjustment mark up to the maximum admissible actual pattern width for optimum processing. Further, the scope of the comparator is considerably reduced, whereby the expense of components of the overall evaluation electronics, according to the invention, is significantly reduced; the reliability and surveyability are correspondingly increased.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block diagram representation of a correlator constructed in accordance with the invention.

DESCRIPTION OF THE PREFERRED EMBODIMENTS

Figure 2:
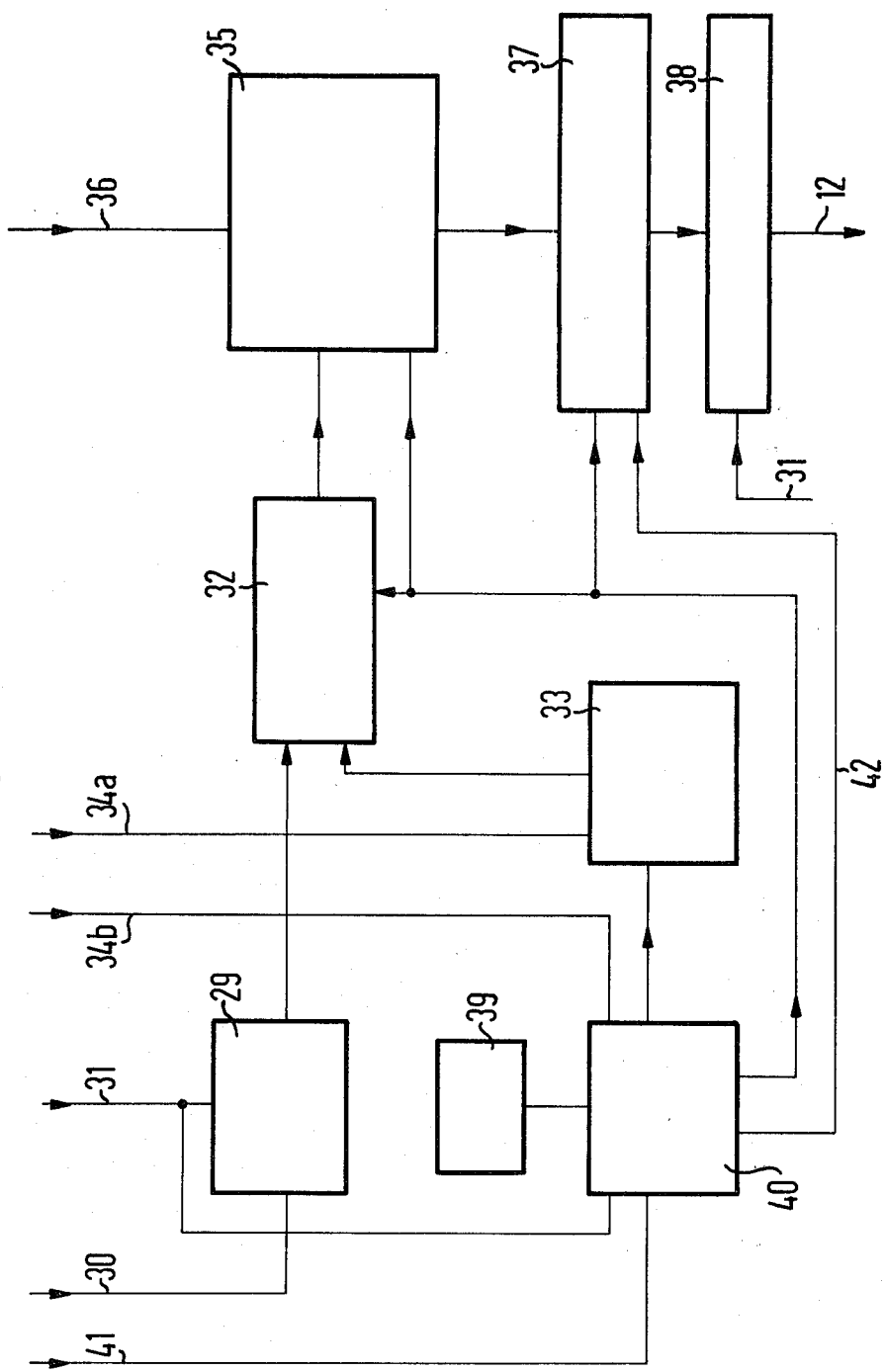
FIG. 2 is a block diagram of the comparison component employed in the correlator of FIG. 1.

Referring to FIG. 1, an actual pattern detector 1 (for example, an electron detector) which forwards detector signals by way of a line 2 to a variable amplifier 3 is illustrated at the upper-left corner. An integrator 5 (for example, an operational amplifier connected as an integrator) whose output is fed to a transfer switch 6 follows the variable amplifier 3. In its upper position, the switch 6 produces a connection to a maximum and minimum detector 7 (for example, consisting of an analog/digital converter, type 74 S 85 comparators and type 74 LS 273 memories, and a digital/analog converter) and, in its lower position, produces a connection to a signal scaler 8 (for example, consisting of a type 74 S 283 module connected as subtractors in order to identify the signal boost, an operational amplifier for the subtraction of the minimum, and a digital/analog multiplier for signal amplification). The signal scaler 8 is followed by an analog/digital converter 9 having an output 10 which is connected to a comparison circuit which is separately illustrated in FIG. 2. In addition, stored signal features arrive by way of a further input 11 from a data processing system EDV (not illustrated).

According to FIG. 1, an adder 13 (which is constructed, for example, with modules of the type 74 LS 283 and 74 LS 244 and with a type 74 LS 273 as a buffer memory) is connected to the output 12 of the comparison component. A sum memory (consisting, for example, of a type LZ 114 module) is referenced 14. The output of the adder 13 is connected by way of a line 15 to the sum memory 14 and by way of a line 16 to a maximum or minimum detector 17 (consisting, for example, of module types 74 LS 273 and 74 LS 85). An output 18 of the sum memory 14 is connected to the data processing system EDV. By way of a line 19, the maximum or minimum detector 17 is connected to a coordinate identifier 20 consisting of a coordinate counter and a coordinate memory. An output 21 of the coordinate identifier 20 is likewise connected to the data processing system which supplies addresses for the sum memory by way of a line 22.

A control 23 (constructed, for example, with modules of the series TTL 74 LS . . . ) receives clock pulses by way of a line 24 and start signals by way of a line 25 from the actual pattern detector 1. The integration time of the integrator 5 can be set by way of a line 26. By way of a line 27, the control 23 receives the number of comparison functions to be summed, as prescribed from the data processing system EDV and receives, by way of a line 28, a complex signal which is described in conjunction with the description of the function. Separate control lines between the individual modules have been omitted for the purpose of clarity.

According to FIG. 2, a programmable address counter 29 (constructed, for example, of a programmed PROM 74 S 472 and a memory 74 LS 273) receives an area transfer signal by way of a line 30 and receives the shift clock and the end of image signal by way of a line 31. The output of the address counter 29 is connected to an adder and an intermediate memory 32 (constructed, for example of adder modules 74 S 283 and memories 74 S 174) which, moreover, is further supplied by a memory 33 (constructed, for example, of memory modules 74 S 189) via a further input. Addresses are written into the memory from the data processing system EDV by way of the lines 34, individually referenced 34a and 34b. The results from the adder 32 form the addresses for an actual value memory 35 (consisting, for example, of memory modules 74 S 200) which receives actual value information by way of a line 36. The outputs of the actual value memory 35 are supplied to a computational unit 37 (comprising, for example, modules 74 S 174, 74 S 283, 74 S 381 and 74 S 169) with an adjacent buffer memory 38 (comprising, for example, of a 74 LS 273 module). A clock generator 39 emits the clock for a memory sequence control 40 (constructed, for example, of a module 74 S 288 or of a random access memory (RAM), the control signals of the memory sequence control 40 being supplied to the memory 33, the intermediate memory of the adder 32, to the actual value memory 35, and to the computational unit 37 with the buffer memory 38.

The system operates as follows. The image information from the actual pattern detector 1 (for example, an electron detector having an electron beam deflection device) is supplied to the variable amplifier 3 and the signal is edited with respect to the amplitude for the following integrator 5 (for example, an operational amplifier having special connections). The amplifier 3, for example, likewise an operational amplifier, executes a rough matching of the detector signal to the working range of an integrator 5. The integrator 5 integrates the matched detector signal in terms of amplitude over a specific time which is prescribed by the clock via the line 24. In a first signal pass, the integrated signal is supplied by way of the switch 6 to the maximum/minimum detector 7 which determines and stores the respective signal maximum/minimum. During a subsequent signal pass, the switch 6 is in its lower position, so that the integrated signal is fed to the signal scaler 8. The signal scaler 8 calculates a direct voltage correction value from the voltage value of the minimum and calculates a gain correction factor from the difference between the maximum and minimum voltages. Dependent on the minimum voltage encountered, the direct voltage correction value is set in such a manner that the minimum assumes a defined, prescribed voltage value.

Independently of the maximum/minimum difference encountered, the gain is set in such a manner that the difference assumes a specific, prescribed value. This scaling has the purpose of being able to fully exploit the digital place range prescribed in the later signal course.

The conversion of the scaled analog signal into digital information is undertaken in a commercially-available analog/digital converter 9. The digitized detector signal is read into the comparator via a line 10, the comparator or comparison component being separately illustrated in FIG. 2. The task of the comparator is to compare the digitized detector signal (actual pattern) to the features prescribed by the data processing system EDV by way of the line 11. The operation of the comparator is completely described below on the basis of FIG. 2.

The results, proceeding clockwise from the comparator via the line 12, are supplied to the adder unit 13 and are added, column-wise, to the addends from the preceding pass which come from the sum memory 14. The results overwrite the earlier values in the sum memory and serve as the new addends in the next comparison pass. This operation is repeated until the number of passes prescribed by the data processing system EDV by way of the line 27 is reached, or until a sum function from the memory 14 is viewed as being sufficient and the prescribed passes are limited. What is meant by sufficient sum function is, for example, that the signal-to-noise ratio exceeds a specific value, the maximum of the sum function exceeds a threshold value or that the rise of the sum function exceeds a specific value in the range of the maximum.

The result from the sum memory 14 is supplied to the maximum/minimum detector 17 by way of the adder 13. A positional coordinate is allocated to each address of the sum memory. A coordinate counter is combined with a coordinate memory in the unit 20. As soon as a maximum is identified, a pulse is transmitted to the memory which triggers the transfer of the coordinate counter reading into the memory. The pulse is generated when a maximum of the sum function is encountered in the maximum detector. The coordinates corresponding to the absolute maximum are output to the data processing system EDV by way of the line 21. Therefore, the amplitude value of the absolute maximum is fixed and can be selected by the data processing system EDV by way of the address line 22. Moreover, proceeding from the maximum coordinate, random other values of the sum function can be selected by the data processing system EDV and be transmitted by way of the line 18 to the data processing system. Such additional values can be evaluated for a more precise identification of positions.

The control module 23 coordinates the internal sequence of the component.

The lines for inputting the feature addresses, which are referenced in FIG. 1 with 11, are indicated in FIG. 2 at 34a and 34b. The values arriving by way of these lines are composed of the feature addresses which are written into the memory 33 and of the addresses for the memory 33 which are supplied to the memory 33 by way of the sequence control 40. The output 10 from the analog/digital converter 9 corresponds to the line 36 of FIG. 2. A shift clock 31 derived in the control 23 from the clock signal 24 and an end of image signal are introduced by way of the lines 31. The line 30 comes from the data processing system EDV. One of two links of comparison range pre-programmed in the device can be selected by way of this line.

A matching of the work cycle of the memory sequence control 40 to various groups of feature addresses can be undertaken by way of the line 41 from the data processing system EDV.

The amplitude values arriving by way of the line 10 or, respectively, 36, from the analog/digital converter arrive in the actual value memory 35 in which, after addressing, the same are stored. The addressing occurs by means of the programmable counter 29 and by way of the adder 32, whereby the outputs from the memory 32 have a constant, specific value. Therewith, the counter reading of the counter 29 is fed through the adder 32 unchanged. The counter reading in the address counter 29 increases within a fixed numerical sequence with each further shift clock which runs synchronously with the actual value. Random and mutually-independent numerical sequences can be realized with the address counter by means of the programming of the PROM.

The selection of the numerical sequences occurs by way of the line 31. After each newly-written amplitude value, the feature addresses written at the beginning by the data processing system EDV in the adder 32 are serially added from the memory 33 to the current counter reading 29 and are forwarded to the actual value memory 35. These operations respectively sequence between two shift clock pulses.

Each time that addresses from the memory 33 are applied by way of the adder 32 to the memory 35 and, therefore, specific actual value amplitudes are selected, the amplitudes are output to the computational unit 37 and, as a function of the operational sign line 42, are added to or subtracted from the content of the computational unit.

The transfer of the content of the computational unit 37 into the buffer memory 38 occurs simultaneously with the writing of a new actual value amplitude into the memory 35. The storage of the new actual value amplitude occurs when the memory cycle of the memory 33 has once sequenced and is again at its specific initial value. A new shift clock pulse then arrives at the address counter 29 by way of the line 31. An address for the actual value memory 35 is then formed in the adder 32 from the new reading of the address counter 29 and from the content of the feature memory 33 and the new amplitude-supporting value is written into the memory cell selected by the address. Each time a value is transmitted from the computational unit 37 to the buffer memory 38, the new value is applied to the output 12 (FIG. 1) of the comparator component.

The memory sequence control 40 contains a programmable counter which supplies the addresses for the memory 33 during the comparison operation and is constructed analogously to the address counter 29. In addition, the memory of the programmable counter contains the release for the clock grid for the computational unit 37, the read/write signal for the actual value memory 35, and the feature operational sign for the computational unit 37. The buffer memory of the memory sequence control 40 and the adder 32 are supplied by a clock which is derived from an oscillator 39. The clock is released dependent upon the shift clock and is shut off dependent upon the reading of the program counter in the memory sequence control 40. The shut-down occurs by means of a signal deposited in the read only memory which is read given a specific counter reading.

The invention is not limited to the exemplary embodiment described and illustrated herein, but is generally suited for the discovery of signal sequences whose configuration is not changed by means of different topical or chronological occurrence.

I therefore intend to include within the patent warranted hereon all changes and modifications which may be included within the scope of my contribution to the art.

I claim:

1. In a method of recognizing image patterns, particularly line patterns, in which a scanning device scans, in columns, an image field carrying an image pattern, a discovered object image with a sought image pattern is executed by converting image points into electrical signal sequences which are compared with signals of a stored pattern, the improvement comprising the steps of:

storing feature addresses including respective positive and negative operational signs;
   repeatedly spatially shifting, with respect to the feature addresses, actual values obtained from scanning to determine line pattern properties and position in the image field and the degree of similarity to a sought pattern in real time;
   weighting the column signal; and
   selecting a positive or negative sum of the numerical values corresponding to the weighted column signals.

2. The improved method of claim 1, comprising the step of:
   addressing a weighting memory with addresses from a feature memory to effect segment-wise weighting of the column values.

3. The improved method of claim 2, comprising the further steps of:
   summing new image scannings; and
   identifying extreme values of the summation by numerically comparing the amplitudes.

4. The improved method of claim 3, comprising the steps of:
   identifying the column position from the maximum value of the summation.

5. The improved method of claim 3, comprising the steps of:
   identifying the column position by comparing the summation with a predetermined value.

6. Apparatus for recognizing image patterns, particularly line patterns, comprising:

a pattern detector for repetitively scanning an image field of line patterns and producing image signals;

first means, including integrating means, connected to said pattern detector and operable, parallel to the line pattern, over a predetermined interval to produce an integrated value for each interval as an integrated version of each image signal;

second means connected to said first means, including an analog/digital converter, an operable to detect, in a first scan over the image pattern, the minimum of the integrated signal and remove this minimum from the signal and produce, for each scan, digital values which correspond to the integrated values of the signals minus the detected minimum;

third means connected to said second means, including comparison means, and actual value memory for storing the digital actual values, and a feature memory storing predetermined feature values and operable to compare actual and feature values for each scan and produce comparison values, segments being formed and said actual value memory with the assistance of the predetermined feature values, newly written actual values having positive operational sign being added within said segments to the most recently formed comparison value and those with negative operational sign being subtracted from the most recently formed comparison value and actual values read from said actual value memory with a positive operational sign being subtracted from said comparison value and those having negative operational sign being added thereto;

fourth means connected to said third means including sum storage means for storing sum values and adding means connected to said sum storage means for adding the comparison and sum values and storing the results of the additions in said sum storage means as new sum values such that the comparison values of one or more scannings of the image field are added and stored in said sum storage means; and fifth means connected to said fourth means, including a maximum value detector operable to detect a maximum value of the sum values and produce a respective pulse, a coordinate identifier responsive to said pulse to assign a respective address in said sum storage means for the maximum value and produce corresponding output addresses for later retrieval of the stored values.

7. The apparatus of claim 6, wherein said third means comprises:

a programmable address counter having a shift clock pulse input;

said actual value memory for storing the digital actual values;

said feature memory for storing feature values;

said adding means connected to said address counter and said said feature memory and connected to and operable to address said actual value memory in response to each new address effected by each shift pulse;

a clock for producing clock pulses;

a memory sequence control connected to said feature memory and to said clock and connected to receive feature addresses, and operable to address said feature memory; and computational means including an operational sign input, connected to said actual value memory for receiving and algebraically adding the output actual value and the previously output actual value in accordance with the input operational sign.

8. The apparatus of claim 7, and further comprising:

a buffer memory connected to the output of said computational means.

9. The apparatus of claim 6, and further comprising:

weighting means connected to the output of said third means.

* * * * *